United States Patent [19]

Helm et al.

[11] Patent Number: 5,719,871
[45] Date of Patent: Feb. 17, 1998

[54] METHOD AND APPARATUS FOR PERFORMING DIVERSITY VOTING IN A COMMUNICATION SYSTEM

[75] Inventors: David P. Helm, Glendale Heights; Alan L. Wilson, Hoffman Estates; Robert D. LoGalbo, Bartlett, all of Ill.

[73] Assignee: Motorola, Inc., Schaumburg, Ill.

[21] Appl. No.: 635,105

[22] Filed: Apr. 19, 1995

[51] Int. Cl.⁶ .................................................. H04J 13/00
[52] U.S. Cl. ........................... 370/479; 370/328; 455/422
[58] Field of Search ................................. 370/479, 513, 370/342, 441, 328, 335; 375/205, 206; 371/2.1, 36, 37.1, 37.4, 41; 455/422; 379/59, 60

[56] References Cited

U.S. PATENT DOCUMENTS

| | | |
|---|---|---|
| 4,648,091 | 3/1987 | Gajjar ................................ 371/37 |
| 4,791,643 | 12/1988 | Molstad et al. ....................... 371/47 |
| 5,285,454 | 2/1994 | Blaum et al. ....................... 371/37.1 |
| 5,365,525 | 11/1994 | Newberg et al. ................... 364/943.9 |
| 5,396,503 | 3/1995 | Thaler et al. ........................ 375/260 |
| 5,491,688 | 2/1996 | Bocci et al. ......................... 370/479 |

Primary Examiner—Douglas W. Olms
Assistant Examiner—Ajit Patel
Attorney, Agent, or Firm—Daniel C. Crilly

[57] ABSTRACT

A communication system (200) employs a method and apparatus for performing diversity voting in the communication system. A comparator (206) receives a signal frame (207–209) of code words from each of multiple signal sources (202–204). A prioritized code word of each signal frame occupies a corresponding frame position and has a respective signal quality metric associated therewith. The comparator determines whether each signal quality metric accurately represents the signal quality of its respective prioritized code word. When the signal quality metrics do not accurately represent the signal qualities of their respective prioritized code words, the comparator determines a supplemental signal quality metric for each prioritized code word. The comparator then selects one prioritized code word from all the corresponding prioritized code words based on a comparison of the supplemental signal quality metrics for input into the corresponding frame position of a voted signal frame (330).

20 Claims, 5 Drawing Sheets

500

METHOD AND APPARATUS FOR PERFORMING DIVERSITY VOTING IN A COMMUNICATION SYSTEM

FIELD OF THE INVENTION

The present invention relates generally to communication systems and, in particular, to performing diversity voting in a communication system.

BACKGROUND OF THE INVENTION

The use of comparators, and their associated voting algorithms, within digital wireless communication systems is known. In general, a comparator, operably coupled to a plurality of base stations or satellite receivers located in geographically diverse areas, attempts to select or construct a favorable representation of an audio signal given multiple sources of the signal (e.g., the base stations). This is accomplished by comparing the signals received from the signal sources and selecting, from amongst all of the signal sources, portions of the signal having the best signal quality. The selected portions are then reassembled to produce a favorable voted signal frame. The voted signal frame can then be retransmitted by a base station, thereby increasing the probability of good reception (i.e., intelligibly decoded audio) at the signal destination (e.g., a mobile communication device).

Within such digital communication systems, audio signals are typically represented as streams of compressed digital data. For example, current "ASTROTAC" comparators manufactured by Motorola, Inc. utilize compressed digital audio parsed into 30 millisecond (ms) signal frames, each signal frame comprising six code words. Thus, while it is possible to perform the necessary comparisons using well-known quality indicators such as signal-to-noise ratios (SNR), the direct comparison of digital data streams is also possible. As a result, digital comparators are known to use code word voting to construct the signal frame best suited for retransmission.

FIG. 1 illustrates one approach to code word voting as performed in existing comparators. As shown, a comparator 101 receives signal frames 102–103 from N different signal sources (only two shown), such as base stations and/or receivers. The signal frames 102–103 ideally correspond to identical portions of a transmitted signal. Each of the signal frames 102–103 comprises six code words 106–117, identified for clarity as $C_{ij}$, where i indicates the signal source and j indicates the position of the code word within the signal frame. Furthermore, each code word 106–117 also includes a code word error status, labeled as $E_{ij}$. Typically, the code word error statuses are determined by the base stations/receivers and are sent to the comparator. In FIG. 1, it is assumed that each error status represents the number of bit errors detected in their respective code words 106–117. As a result, a code word having the lowest error status (i.e., fewer bit errors) is assumed to be the least corrupt and representative of the best possible audio quality.

According to this approach, the comparator 101 compares all code words 106–117, based on their respective code word error statuses, having equivalent identifications (frame positions). Thus, all code words $C_{i1}$, for i=1 to N, are compared based on their error statuses, $E_{i1}$. In the example shown, $E_{N1} < E_{11}$ and $C_{N1}$ is thus selected by the comparator 101 for use in the voted signal frame 104. Using the same procedure, $C_{12}$, $C_{N3}$, $C_{14}$, $C_{15}$, and $C_{N6}$ are also selected. This process is repeated each time a new set of signal frames is input to the comparator 101.

The above-described approach works well from an audio quality point of view in that voting occurs on each small segment of the signal (i.e., the code words). However, a limitation of this approach is the amount of throughput required to send the code word error statuses to the comparator. For example, 30 ms signal frames that include 14 code word error status bits require a throughput rate of 466.7 bits per second for the code word error status bits alone. If the signal frame rate or the number of bits used for the error statuses increases, the required throughput rate is increased. For example, the Association of Public Safety Communication Officers (APCO) has created a standard—Telecommunications Industry Association (TIA) Standard No. TSB102.BAAA—specifying 20 ms frames. In order to achieve compliance with this standard, either more throughput capacity is needed to send the same number of error status bits or less error status bits can be sent. Since the throughput rates of the links (e.g., telephone lines) connecting the signal sources to the comparator are typically limited, the first alternative is generally not viable. However, if the number of error status bits per frame is decreased, the resulting code word error statuses may not be able to provide accurate measurements of each code word's quality.

Another approach for performing diversity voting is provided in U.S. Pat. No. 5,491,688, entitled "Method For Providing A Favorable Signal Representation" and assigned to the assignee of the present invention. In this approach, the code words of each input signal frame are divided into priority and non-priority sets. Each code word in a priority set has an error status associated therewith; whereas, each code word in a non-priority set does not. In addition, each signal frame has an error status associated therewith. In one embodiment, the comparator compares error statuses for corresponding code words in the priority sets and selects the code words having the more favorable error statuses as the voted code words from the priority sets. The comparator then compares the error statues of the signal frames and selects the code words in the non-priority sets that are associated with the signal frame having the more favorable error status to produce the voted code words from the non-priority sets. The voted code words are then used to produce the voted signal frame.

For example, assume that each signal frame includes seven code words and has an error status associated therewith. The code words in the first and fifth frame positions of each signal frame are accompanied by respective error statuses; however, the remaining code words of each signal frame are not are accompanied by error statuses. In this case, the code words in the first and fifth frame positions of each signal frame constitute a priority set and the code words in the second, third, fourth, sixth, and seventh frame positions of each signal frame constitute a non-priority set. When two signal frames are received by the comparator, the comparator compares the error statuses of the first-positioned code words of each signal frame and selects the first-positioned code word associated with the lower code word error status to produce the voted code word for input into the first frame position of the voted signal frame. Similarly, the comparator compares the error statuses of the fifth-positioned code words of each signal frame and selects the fifth-positioned code word associated with the lower code word error status to produce the voted code word for input into the fifth frame position of the voted signal frame. To produce the voted code words for input into the second, third, fourth, sixth, and seventh frame positions of the voted signal frame, the comparator selects the second, third, fourth, sixth, and seventh-positioned code words in the signal frame having the lower frame error status. The comparator then produces a voted signal frame with the voted code words.

In another embodiment of this approach, the voted code words are selected based solely on the frame error statuses, without distinguishing between priority and non-priority sets. In this case, the comparator selects the code words from the signal frame having the more favorable frame error status as the voted code words. Although both embodiments of this approach have the advantage of permitting diversity voting with a lower number of error bits per signal frame, neither embodiment takes into account the accuracy of the error status values, especially with respect to the code words in the priority sets. Thus, with this approach, a code word in a priority set may be selected as a voted code word due to its apparently more favorable code word error status even though, due to the number of errors in the code words being compared, the error statuses relied upon in making the selection do not accurately represent the actual signal qualities of the code words being compared. In this case, the code word with the apparently more favorable code word error status might actually produce a less favorable voted signal frame.

Such a condition where a code word with an apparently more favorable code word error status actually produces a less favorable voted signal frame might arise when utilizing the 20 ms frames specified in the APCO standard. In accordance with the APCO standard, non-priority code words are combined, prior to transmission, with a pseudo-noise (PN) sequence produced from the information content of a single priority code word. Consequently, a receiver, such as a satellite receiver, must first decode the priority code word, then reproduce the PN sequence from the priority code word, and finally subtract the PN sequence from the code words received in the non-priority frame positions to extract the contents of the non-priority code words. Only after performing these three steps can the receiver decode the non-priority code words. A mistake in the selection of the most correct (highest quality) priority code word will therefore cause a multiplication of errors during the decoding of the non-priority code words. Thus, selection of priority code words based solely on their apparent signal quality estimates (error statuses), as in existing techniques, may lead not only to low quality priority code words in a voted signal frame, but may also lead to low quality non-priority code words in the voted signal frame.

Therefore, a need exists for a method and apparatus for performing diversity voting in a communication system that allows a voted signal frame of suitable audio quality to be produced in high error environments based on fewer error status bits per frame.

DESCRIPTION OF A PREFERRED EMBODIMENT

Generally, the present invention encompasses a method and apparatus for performing diversity voting in a communication system. A comparator, or other comparable device, receives a signal frame from each of a plurality of signal sources, such as base stations. Each signal frame includes a group of code words that occupy respective frame positions within each signal frame. A prioritized code word (e.g., a code word occupying the fifth frame position) has a respective signal quality metric associated therewith. The comparator determines whether each signal quality metric accurately represents the signal quality of its respective prioritized code word. When the signal quality metrics do not accurately represent the signal qualities of their respective prioritized code words, the comparator determines a supplemental signal quality metric for each prioritized code word. The comparator then selects one prioritized code word from all the corresponding prioritized code words based on a comparison of the supplemental signal quality metrics to produce a voted code word. When the signal quality metrics accurately represent the signal qualities of their respective prioritized code words, the comparator selects one prioritized code word from all the corresponding prioritized code words based on a comparison of the signal quality metrics of the prioritized code words to produce the voted code word. By selecting the voted code word in this manner, the present invention provides comparator output signals having more favorable audio quality in high bit error environments than do existing approaches that do not predicate the decision to compare signal quality metrics of corresponding code words on the accuracy of the signal quality metrics.

Figure 1:
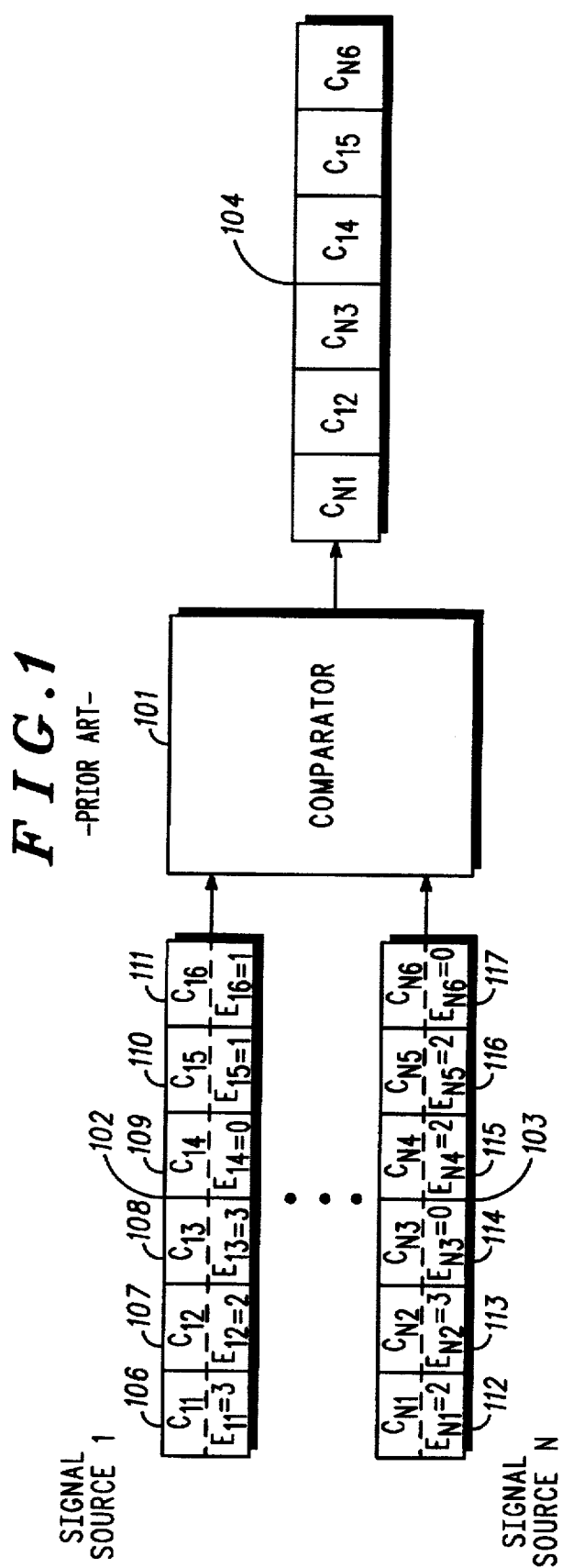
FIG. 1 illustrates a typical technique for performing diversity voting using a comparator.
Figure 2:
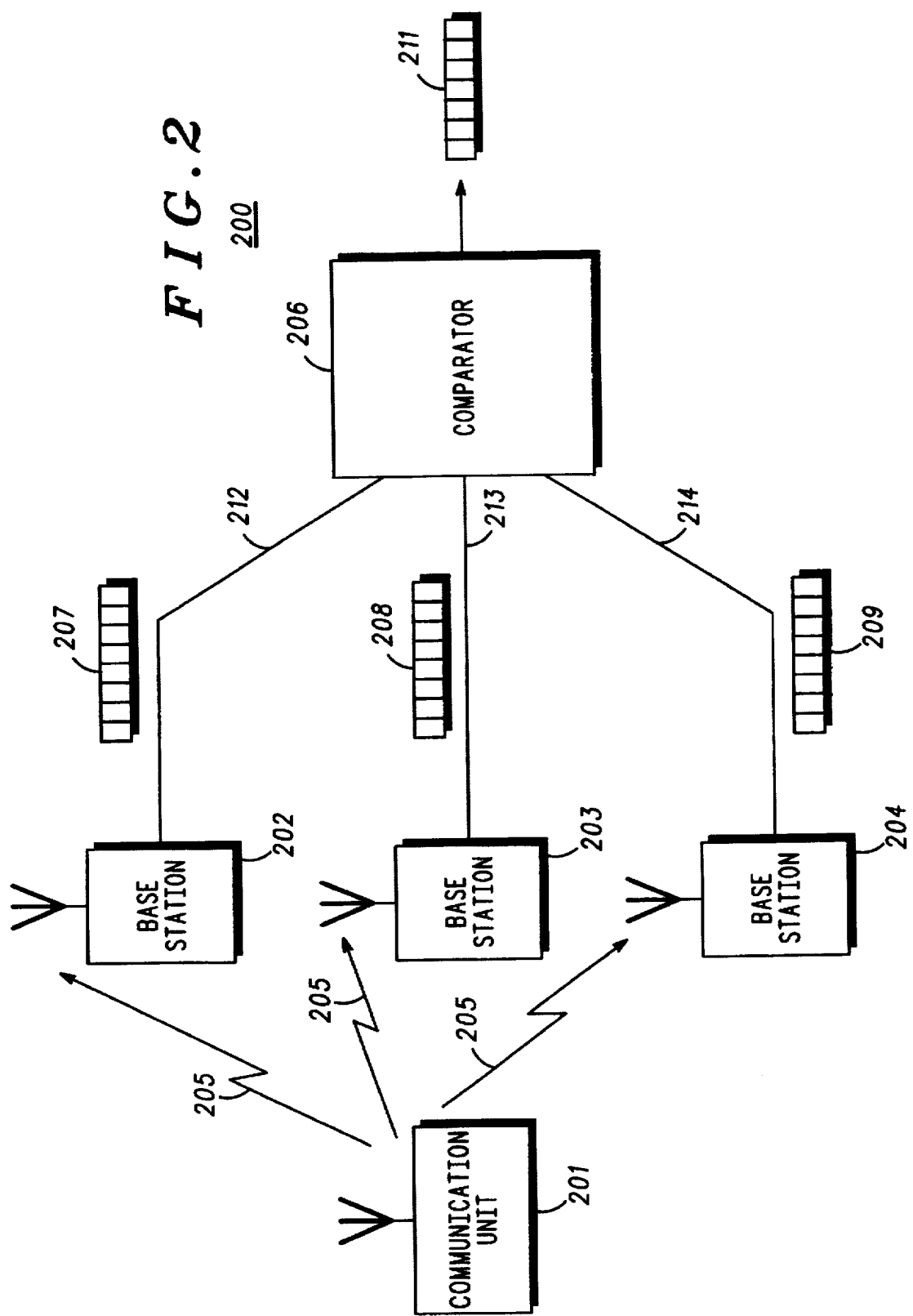
FIG. 2 illustrates a block diagram depiction of a diversity radio communication system in accordance with the present invention.

The present invention can be more fully described with reference to FIGS. 2–5. FIG. 2 illustrates a block diagram depiction of a diversity radio communication system 200 in accordance with the present invention. The diversity radio communication system 200 includes at least one communication unit 201, a plurality of base stations 202–204, and a comparator 206. The communication unit 201 preferably comprises an "ASTRO" portable radio that is manufactured by Motorola, Inc. and that provides voice communications in the form of compressed digital audio. The base stations 202–204 preferably comprise "QUANTAR" base stations that are manufactured by Motorola, Inc. and that receive the compressed digital audio transmitted by the communication unit 201. The comparator 206 preferably comprises an "ASTROTAC" comparator that is manufactured by Motorola, Inc. and that has been modified for use in accordance with the present invention. The comparator 206 produces a voted signal frame 211 from a plurality of signal frames 207–209 provided by the base stations 202–204.

Operation of the radio communication system 200 occurs substantially as follows in accordance with the present invention. The communication unit 201 transmits a data signal or a compressed digital audio signal to the base stations 202–204 via a wireless communication resource 205. Depending on the platform configuration of the radio communication system 200, the communication resource 205 might comprise a pair of radio frequency (RF) carriers in a frequency division multiplexed (FDM) platform, a pair of time slots in a time division multiplexed (TDM) platform, or any other RF transmission media. Each of the base stations 202–204 receive the transmitted signal, typically at different times, and parse the received signal into signal frames 207–209 that include a plurality of code words. In a preferred embodiment, the compressed digital audio signal transmitted by the communication unit 201 is generated using a known Improved Multi-Band Excitation (IMBE) encoder within the communication unit 201. Thus, in the preferred embodiment, each signal frame 207–208 includes seven IMBE code words.

The base stations 202–204 determine signal quality metrics for all of the code words. In the preferred embodiment, the signal quality metrics comprise error statuses; however, in an alternative embodiment, the signal quality metrics might comprise signal-to-noise ratios (SNRs), received signal strength indications (RSSIs), bit error rates (BERs), or path metric values resulting from Viterbi decoding of trellis encoded signals. Techniques for determining such signal quality metrics are well-known; thus, no further discussion will be presented except to facilitate an understanding of the present invention. In addition to determining signal quality metrics for the code words, the base stations 202–204 also determine signal quality metrics for their respective signal frames 207–209. In the preferred embodiment, the quality metric for each signal frame 207–209 comprises a frame error status that is computed by summing the error statuses for the individual code words of the respective signal frame 207–209.

Upon determining the code word and signal frame signal quality metrics, the base stations 202–204 convey the signal frames 207–209, including the signal frame signal quality metrics and some, but not all, of the code word signal quality metrics, to the comparator 206 via wireline links 212–214. As previously discussed, the limited bandwidth of the wireline links 212–214, as well as the need to transmit other information, typically prohibits the transmission of all of the code word signal quality metrics and the signal frame signal quality metric for each frame 207–209.

Upon receiving the signal frames 207–209, the comparator 206 performs the diversity voting procedure. The comparator 206 determines whether the signal quality metrics of two code words ($C_{11}$ and $C_{21}$) in two of the signal frames (e.g., signal frames 207 and 208) accurately represent the signal quality of the code words. In the preferred embodiment, this determination comprises comparing the error statuses to a predetermined signal quality threshold. When both error statuses are indicative of a higher signal quality (i.e., are less) than the predetermined quality threshold, the comparator 206 determines that the error statuses accurately represent the signal qualities of the code words. On the other hand, when both error statuses are indicative of a signal quality that is substantially equal to or lower (i.e., greater) than the predetermined quality threshold, the comparator 206 determines that the error statuses do not accurately represent the signal qualities of the code words.

When both error statuses are indicative of a higher signal quality than the predetermined quality threshold, the comparator 206 selects the first-positioned code word of the two code words being compared that has an error status indicative of a higher signal quality for input into the first frame position of the voted signal frame. When both error statuses are indicative of a signal quality that is substantially equal to or lower than the predetermined quality threshold, the comparator 206 determines a supplemental error status for each code word being compared and selects the code word associated with the supplemental error status indicative of a higher signal quality for input into the first frame position of the voted signal frame.

Figure 3:
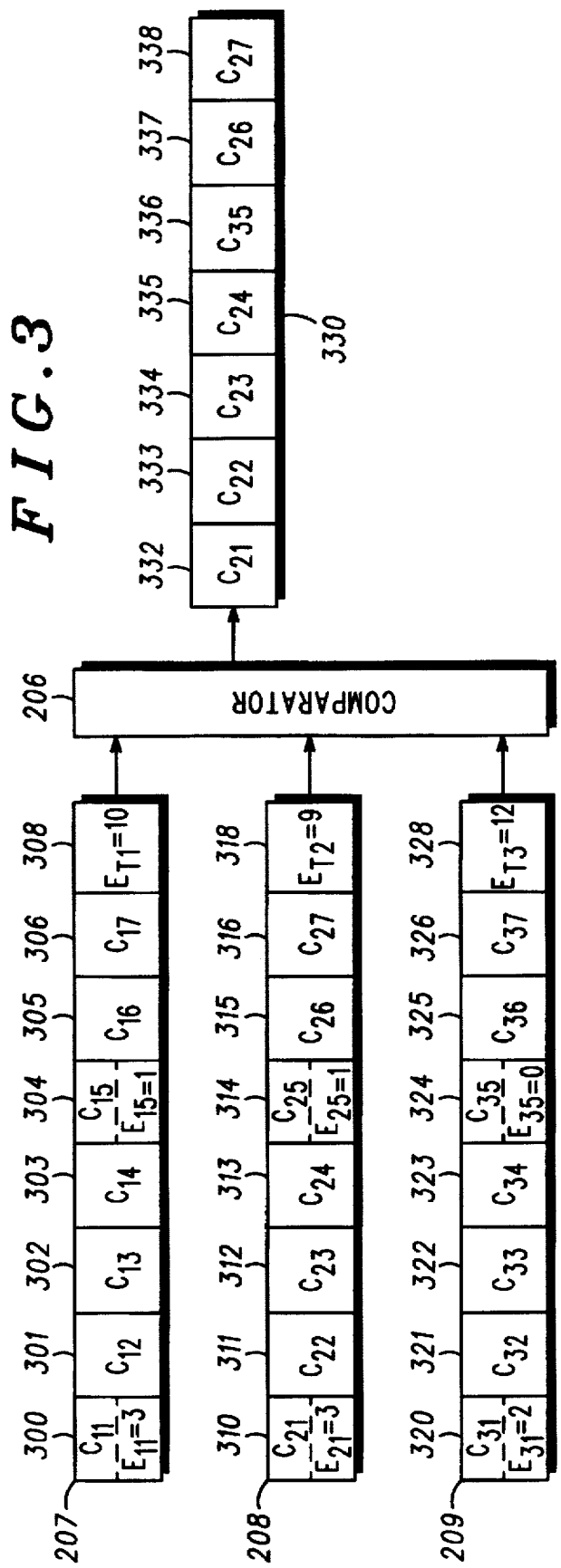
FIG. 3 illustrates a comparator performing diversity voting in accordance with the present invention.

FIG. 3 illustrates in greater detail the exemplary signal frames 207–209 input to the comparator 206 in accordance with the preferred embodiment of the present invention. Each signal frame 207–209 includes seven code words, a signal frame error status, and particular code word error statuses. The code words 300–306, 310–316, 320–326 and the code word error statuses of each signal frame 207–209 are uniquely identified as $C_{ij}$ and $E_{ij}$, respectively, where i indicates the signal source (base station) and j indicates the code word position within the signal frame. Additionally, the signal frame error statuses 308, 318, 328 are uniquely identified as $E_{Ti}$. It is understood that the code words, the code word error statuses, and the signal frame error status for each frame 207–209 can be arranged as shown or interleaved, in part or in whole, in any suitable manner as necessary. Further, even though only three input signal frames 207–209 are depicted in FIG. 3, the present invention is applicable to any number of input signal frames from any number of signal sources.

In the preferred embodiment, as shown, the code word error statuses of only the first-positioned and fifth-positioned code words 300, 304, 310, 314, 320, 324 in each signal frame 207–209 are provided to the comparator 206. The error statuses for these code words are provided because the first-positioned code word is critical to audio pitch and the fifth-positioned code word is necessary for the computation of adaptive smoothing in accordance with IMBE vocoding (i.e., voice encoding/decoding). Accordingly, in the preferred embodiment, the first-positioned and the fifth-positioned code words of each signal frame 207–209 are considered prioritized code words; whereas, the second-positioned, third-positioned, fourth-positioned, sixth-positioned, and seventh-positioned code words of each signal frame 207–209 are considered unprioritized code words. In an alternative embodiment, code word error statuses for other positioned code words might be provided depending on the selected form of vocoding used in the communication system 200. In the alternative embodiment, those code words associated with individual code word error statuses, or other forms of code word signal quality metrics, are considered prioritized code words, while those code words not associated with individual code word signal quality metrics are considered unprioritized code words. It is assumed for the remainder of the discussion of FIG. 3 that only the first-positioned and fifth-positioned code words 300, 304, 310, 314, 320, 324 in each signal frame 207–209 have code word error statuses associated therewith.

Upon receiving the multiple input signal frames 207–209, the comparator 206 produces a voted signal frame 330 of voted code words 332–338, wherein the voted code words 332–338 constitute code words from one or more of the input signal frames 207–209. To determine the voted code words 332–338, the comparator 206 performs error status (signal quality metric) comparisons to select code words from the signal frames 207–209 to produce corresponding voted code words in the voted signal frame 330. In the preferred embodiment, the voted code word 332 in the first frame position of the voted signal frame 330 is chosen by analyzing the code word error statuses ($E_{i1}$) of the code words 300, 310, 320 in the first frame position of each input signal frame 207–209. The code word error statuses of the first-positioned code words 300, 310, 320 are first analyzed to determine whether the code word error statuses accurately represent the signal qualities of their respective code words 300, 310, 320. That is, the comparator 206 determines whether the code word error status ($E_{11}$) of code word 300 accurately represents the signal quality of code word 300, whether the code word error status ($E_{21}$) of code word 310 accurately represents the signal quality of code word 310, and whether the code word error status ($E_{31}$) of code word 320 accurately represents the signal quality of code word 320.

To determine whether the code word error statuses accurately represent the signal qualities of their respective first-positioned code words 300, 310, 320, the comparator 206 preferably compares each error status to a predetermined quality threshold. When at least one of the code word error statuses is indicative of a higher signal quality than the threshold, the comparator 206 selects the first-positioned code word that is associated with the error status indicating the highest signal quality as the voted code word to be inserted into the first frame position of the voted signal frame 330. However, when none of the code word error statuses is indicative of a higher signal quality than the threshold, the comparator 206 determines a supplemental error status for each code word 300, 310, 320. The comparator 206 then selects the first-positioned code word that is associated with the supplemental error status indicating the highest signal quality as the voted code word to be inserted into the first frame position of the voted signal frame 330. In the preferred embodiment, the supplemental error status of each first-positioned code word comprises the signal frame error status of the signal frame containing the respective first-positioned code word.

The voted code word 336 in the fifth frame position of the voted signal frame 330 is preferably chosen by analyzing the code word error statuses ($E_{i5}$) of the code words 304, 314, 324 in the fifth frame position of each input signal frame 207–209. The code word error statuses of the fifth-positioned code words 304, 314, 324 are first analyzed to determine whether the code word error statuses accurately represent the signal qualities of their respective code words 304, 314, 324. That is, the comparator 206 determines whether the code word error status ($E_{15}$) of code word 304 accurately represents the signal quality of code word 304, whether the code word error status ($E_{25}$) of code word 314 accurately represents the signal quality of code word 314, and whether the code word error status ($E_{35}$) of code word 324 accurately represents the signal quality of code word 324.

To determine whether the code word error statuses accurately represent the signal qualities of their respective fifth-positioned code words 304, 314, 324, the comparator 206 preferably determines whether the code word error statuses (signal quality metrics) are substantially equal. When the error statuses are not substantially equal, the comparator 206 selects the fifth-positioned code word that is associated with the error status indicating the highest signal quality as the voted code word to be inserted into the fifth frame position of the voted signal frame 330. However, when the error statuses are substantially equal, the comparator 206 determines a supplemental error status for each code word 304, 314, 324. The comparator 206 then selects the fifth-positioned code word that is associated with the supplemental error status indicating the highest signal quality as the voted code word to be inserted into the fifth frame position of the voted signal frame 330. In the preferred embodiment, the supplemental error status of each fifth-positioned code word comprises the signal frame error status of the signal frame containing the respective fifth-positioned code word.

The voted code words 333–335, 337–338 in the other frame positions (i.e., second, third, fourth, sixth, and seventh frame positions) of the voted signal frame 330 are preferably chosen by computing group error statuses for the code words 301–303, 305–306, 311–313, 315–316, 321–323, 325–326 in those frame positions and selecting the code words associated with the group error status that indicates the highest signal quality of the group error statuses. In the preferred embodiment, the group error status for the code words in the second, third, fourth, sixth, and seventh frame positions of each input signal frame 207–209 comprises the respective signal frame error status ($E_{Ti}$) less the error statuses ($E_{i1}$ and $E_{i5}$) of the first-positioned and fifth-positioned code words of the signal frame (i.e., $E_{GROUP} = E_{Ti} - E_{i1} - E_{i5}$).

Selection of the voted code words 332–338 in accordance with the preferred embodiment may be more fully understood by way of the example depicted in FIG. 3. Upon receiving the three input signal frames 207–209, the comparator 206 first performs code word error status comparisons of the code word error statuses of the prioritized code words 300, 304, 310, 314, 320, 324 to produce voted code words 332, 336 that occupy the same frame positions in the voted signal frame 330 that the prioritized code words 300, 304, 310, 314, 320, 324 occupy in their respective input signal frames 207–209. Using the comparison techniques described above, the comparator 206 compares the code word error status ($E_{i1}$) of each code word 300, 310, 320 in the first frame position of each input signal frame 207–209 to a predetermined quality threshold. In the preferred embodiment, the predetermined quality threshold is an error status of 2. Since all three error statuses ($E_{11}=3$, $E_{21}=3$, $E_{31}=2$) are greater than or equal to the predetermined quality threshold (thereby indicating an equal or lower signal quality than the signal quality referenced by the threshold), the comparator 206 determines that the code word error statuses ($E_{i1}$) do not accurately represent the signal qualities of their respective code words 300, 310, 320.

Since the code word error statuses ($E_{i1}$) do not accurately represent the signal qualities of their respective code words 300, 310, 320, the comparator 206 determines that the code word error statuses ($E_{i1}$) cannot be used to select a voted code word and, therefore, determines a supplemental error status for each code word 300, 310, 320. In the preferred embodiment, the supplemental error status for each code word 300, 310, 320 is the signal frame error status ($E_{Ti}$) of the signal frame containing the respective code word 300, 310, 320. Thus, the supplemental code word error status for code word 300 is 10, the supplemental code word error status for code word 310 is 9, and the supplemental code word error status for code word 320 is 12. Upon determining the supplemental code word error statuses, the comparator 206 selects the code word associated with the lowest-valued supplemental code word error status (i.e., the code word associated with the signal quality metric indicative of highest signal quality) as the voted code word 332 for the first frame position of the voted signal frame 330. In this example, the comparator 206 selects code word 310 ($C_{21}$) as the voted code word 332 for the first frame position of the voted signal frame 330 because its supplemental code word error status is the lowest of the three supplemental code word error statuses.

Had at least one of the code word error statuses ($E_{i1}$) been less than the threshold and thereby accurately represented the signal quality of its respective code word, the comparator 206 would have selected the code word associated with the lowest-valued code word error status as the voted code word 332 for the first frame position of the voted signal frame 330. For example, had the code word error status ($E_{31}$) of code word 320 been 1 instead of 2, the comparator 206 would have selected code word 320 as the voted code word 332 for the first frame position of the voted signal frame 330.

Since the code words 304, 314, 324 in the fifth frame positions of the input signal frames 207–209 are also prioritized code words, the comparator 206 determines whether the code word error statuses ($E_{i5}$) of these code words accurately represent the signal qualities of the code words 304, 314, 324. To make this determination, the comparator 206 compares the code word error statuses ($E_{i5}$) of the code words 304, 314, 324 in the fifth frame positions of the signal frames to each other. When the code word error statuses ($E_{i5}$) are substantially equal (e.g., within 0.5 of each other), the comparator 206 determines that the code word error statuses ($E_{i5}$) do not accurately represent the signal qualities of their respective code words 304, 314, 324 and, therefore, determines supplemental error statuses for the code words 304, 314, 324 preferably in the same manner as described above with regard to the selection of the first-positioned voted code word 332. However, as in the present example, when the code word error statuses ($E_{i5}$) are not substantially equal and, therefore, do accurately represent the signal qualities of their respective code words 304, 314, 324, the comparator 206 selects the code word having the lowest-valued code word error status (i.e., the code word associated with the code word error status indicative of highest signal quality) as the voted code word 336 for the fifth frame position of the voted signal frame 330. In this example, the selected code word is code word 324.

Upon selecting the voted code words 332, 336 from the prioritized group of input code words 300, 304, 310, 314, 320, 324, the comparator 206 selects the voted code words 333, 334, 335, 337, 338 from the unprioritized group of input code words 301-303, 305-306, 311-313, 315-316, 321-323, 325-326. The comparator 206 first determines a group error status ($E_{GROUP}=E_{Ti}-E_{i1}-E_{i5}$) for the unprioritized code words in each input signal frame 207-209. Thus, the group error status for the unprioritized code words in signal frame 207 is 6, the group error status for the unprioritized code words in signal frame 208 is 5, and the group error status for the unprioritized code words in signal frame 209 is 10. The comparator 206 then selects the unprioritized code words having the lowest-valued group error status (i.e., the code words associated with the group error status indicative of highest signal quality) as the voted code words for the second, third, fourth, sixth, and seventh frame positions of the voted signal frame 330. In this example, the voted unprioritized code words are code words 333, 334, 335, 337, 338. The voted prioritized and unprioritized code words are then used to form the voted signal frame 330.

As described above, the present invention provides a diversity voting methodology that accommodates IMBE signal frames, permits voting to be accomplished without requiring code word signal quality metrics to be provided for each code word, and analyzes the accuracy of the provided code word signal quality metrics before selecting voted code words based on those code word signal quality metrics. Therefore, in contrast to existing voting techniques, the present invention analyzes the accuracy of signal quality metrics associated with the highest priority code words in each input signal frame before selecting one or more of such code words to fill corresponding frame positions in the voted signal frame. By taking into account the accuracy of the priority code word signal quality metrics during the voting process, the present invention provides a more favorable selection of code words than do existing techniques, thereby resulting in a higher quality voted signal frame for retransmission by a base station or for presentation of audio at a dispatcher console position.

Figure 4:
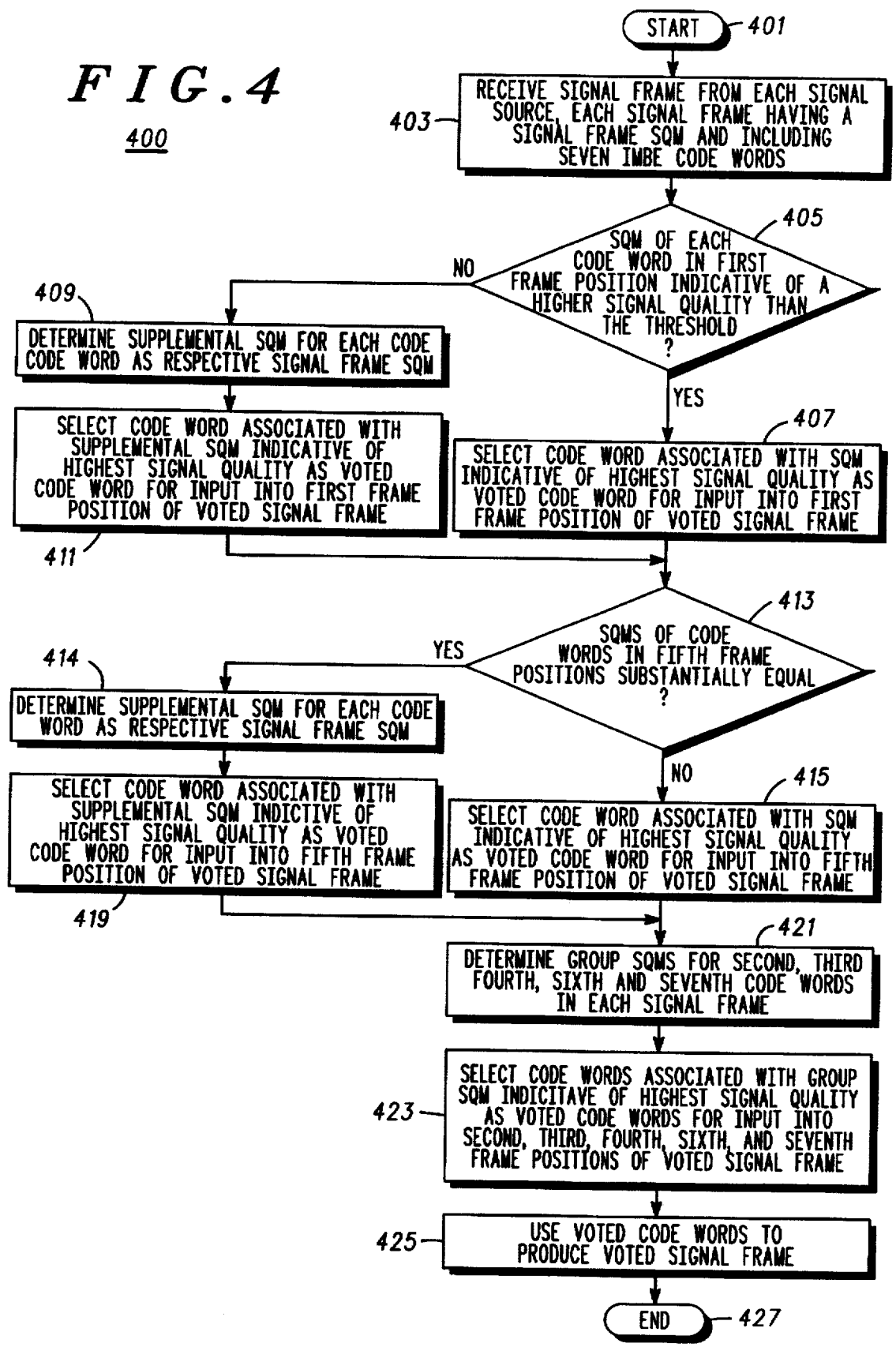
FIG. 4 illustrates a logic flow diagram of steps executed by a comparator to perform diversity voting in accordance with a preferred embodiment of the present invention.

FIG. 4 illustrates a logic flow diagram 400 of steps executed by a comparator to perform diversity voting in accordance with a preferred embodiment of the present invention. The logic flow begins (401) when the comparator receives (403) a signal frame from each signal source (e.g., base station), wherein each signal frame includes seven IMBE code words and has a signal frame signal quality metric (SQM) associated therewith. In addition to the signal frame having a signal frame signal quality metric, prioritized code words of the signal frames have code word signal quality metrics associated therewith. The signal frame and code word signal quality metrics are conveyed together with the code words in each signal frame. In the preferred embodiment, the prioritized code words are the code words occupying the first and fifth frame positions of each signal frame. The signal frame and code word signal quality metrics preferably comprise respective error statuses; however, in an alternative embodiment, the signal quality metrics might comprise SNRs, RSSIs, BERs, or path metric values resulting from Viterbi decoding of trellis encoded signals.

Upon receiving the input signal frames, the comparator determines (405) whether the code word signal quality metric of each code word in the first frame position is indicative of a higher signal quality than a signal quality threshold. In the preferred embodiment, this determination is made by determining whether the code word error status of each code word in the first frame position is less than the threshold error status. In an alternative embodiment that utilizes SNRs as the signal quality metrics, this determination is made by determining whether the code word SNR of each code word in the first frame position is greater than the threshold SNR. Therefore, the determination of whether the code word signal quality metric of each code word in the first frame position is indicative of a higher signal quality than a signal quality threshold is dependent upon the choice of signal quality metric used in the system.

When the signal quality metric of at least one code word in a first frame position is indicative of a higher signal quality than the signal quality threshold (e.g., when the code word in the first frame position of the first signal frame has a code word error status that is less than the threshold error status), the comparator selects (407) the first-positioned code word that has a signal quality metric indicative of a highest signal quality of all the considered first-positioned code words as the voted code word for input into the first frame position of the voted signal frame. In the preferred embodiment, the first-positioned code word having the lowest-valued error status is selected as the first-positioned voted code word. In the alternative embodiment that utilizes SNR as the signal quality metric, the first-positioned code word having the highest-valued SNR is selected as the first-positioned voted code word.

In the event that two or more first-positioned code words have code word signal quality metrics indicative of equivalent signal qualities that are the highest of the signal qualities being compared and are higher than the signal quality threshold, the comparator preferably selects any one of the first-positioned code words associated with these signal quality metrics as the voted code word for input into the first frame position of the voted signal frame because all of these first-positioned code words are considered equally favorable.

When the signal quality metric of all the code words in the first frame position is indicative of an equal or lower signal quality than the signal quality threshold (e.g., when all the code words in the first frame positions of the signal frames have code word error statuses that are greater than or equal to the threshold error status), the comparator determines (409) a supplemental signal quality metric for each first-positioned code word. In the preferred embodiment, the supplemental signal quality metric of each first-positioned code word is the signal frame signal quality metric of the signal frame that includes the respective first-positioned code word. For example, the supplemental signal quality metric of the first-positioned code word in the first signal frame is the signal frame signal quality metric of the first signal frame, the supplemental signal quality metric of the first-positioned code word in the second signal frame is the signal frame signal quality metric of the second signal frame, and so on.

Once the supplemental signal quality metrics for the first-positioned code words are determined, the comparator selects (411) the first-positioned code word associated with the supplemental signal quality metric indicative of a highest signal quality of all the considered first-positioned code words as the voted code word for input into the first frame position of the voted signal frame. In the preferred embodiment, the first-positioned code word in the signal frame having the lowest-valued signal frame error status is selected as the first-positioned voted code word. In the event that two or more first-positioned code words have supplemental signal quality metrics indicative of equivalently high signal qualities, the comparator preferably selects any one of the first-positioned code words associated with these supplemental signal quality metrics as the voted code word for input into the first frame position of the voted signal frame because all of these first-positioned code words are considered equally favorable.

Upon selecting the first-positioned voted code word, or during selection of the first-positioned voted code word when parallel processing is used, the comparator determines (413) whether the signal quality metrics of the code words in the fifth frame positions are substantially equal. When the signal quality metrics of the code words in the fifth frame positions are not substantially equal, the comparator selects (415) the fifth-positioned code word that has a signal quality metric indicative of a highest signal quality of all the considered fifth-positioned code words as the voted code word for input into the fifth frame position of the voted signal frame. In the preferred embodiment, the fifth-positioned code word having the lowest-valued error status is selected as the fifth-positioned voted code word. In the alternative embodiment that utilizes SNR as the signal quality metric, the fifth-positioned code word having the highest-valued SNR is selected as the fifth-positioned voted code word.

When the signal quality metrics of the code words in the fifth frame positions are substantially equal, the comparator determines (414) a supplemental signal quality metric for each fifth-positioned code word. In the preferred embodiment, the supplemental signal quality metric of each fifth-positioned code word is the signal frame signal quality metric of the signal frame that includes the respective fifth-positioned code word. For example, the supplemental signal quality metric of the fifth-positioned code word in the first signal frame is the signal frame signal quality metric of the first signal frame, the supplemental signal quality metric of the fifth-positioned code word in the second signal frame is the signal frame signal quality metric of the second signal frame, and so on.

Once the supplemental signal quality metrics for the fifth-positioned code words are determined, the comparator selects (419) the fifth-positioned code word associated with the supplemental signal quality metric indicative of a highest signal quality of all the considered fifth-positioned code words as the voted code word for input into the fifth frame position of the voted signal frame. In the preferred embodiment, the fifth-positioned code word in the signal frame having the lowest-valued signal frame error status is selected as the fifth-positioned voted code word. In the event that two or more fifth-positioned code words have supplemental signal quality metrics indicative of equivalently high signal qualities, the comparator preferably selects any one of the fifth-positioned code words associated with these supplemental signal quality metrics as the voted code word for input into the fifth frame position of the voted signal frame because all of these fifth-positioned code words are considered equally favorable.

Upon selecting the voted code words for the first and fifth frame positions of the voted signal frame, the comparator determines (421) group signal quality metrics for the second, third, fourth, sixth, and seventh-positioned code words (i.e., the unprioritized code words) in each signal frame. That is, the comparator determines one group signal quality metric for the second, third, fourth, sixth, and seventh-positioned code words in the first signal frame, another group signal quality metric for the second, third, fourth, sixth, and seventh-positioned code words in the second signal frame, and so on until each group of unprioritized code words has an associated group signal quality metric. Each group signal quality metric is derived from the code word signal quality metrics of the first-positioned and fifth-positioned code words and the signal frame signal quality metric. In the preferred embodiment, each group signal quality metric comprises a group error status and is derived by subtracting the code word error statuses of the first-positioned and the fifth-positioned code words from the appropriate signal frame error status. For example, the group error status for the group of unprioritized code words in the first signal frame results from the subtraction of the code word error statuses of the first-positioned and the fifth-positioned code words in the first signal frame from the signal frame error status of the first signal frame.

Once the group signal quality metrics are determined, the comparator selects (423) the second-positioned, third-positioned, fourth-positioned, sixth-positioned, and seventh-positioned code words associated with the group signal quality metric that is indicative of the highest signal quality of all the considered groups of unprioritized code words as the voted code words for input into the second, third, fourth, sixth, and seventh frame positions of the voted signal frame. In the preferred embodiment, the group of code words having the lowest-valued error status is selected as the group of voted code words to occupy the second, third, fourth, sixth, and seventh frame positions of the voted signal frame. In the alternative embodiment that utilizes SNR as the signal quality metric, the group of code words having the highest-valued SNR is selected as the group of voted code words to occupy the second, third, fourth, sixth, and seventh frame positions of the voted signal frame.

In the event that two or more groups of unprioritized code words have group signal quality metrics indicative of equivalently high signal qualities, the comparator preferably selects the code words from any one of the groups of unprioritized code words associated with these group signal quality metrics as the voted unprioritized code words for input into the second, third, fourth, sixth, and seventh frame positions of the voted signal frame.

Upon selecting all the voted code words, the comparator uses (425) the voted code words to produce the voted signal frame and the logic flow ends (427). The comparator inserts the voted code words into their appropriate frame positions to produce the voted signal frame.

Figure 5:
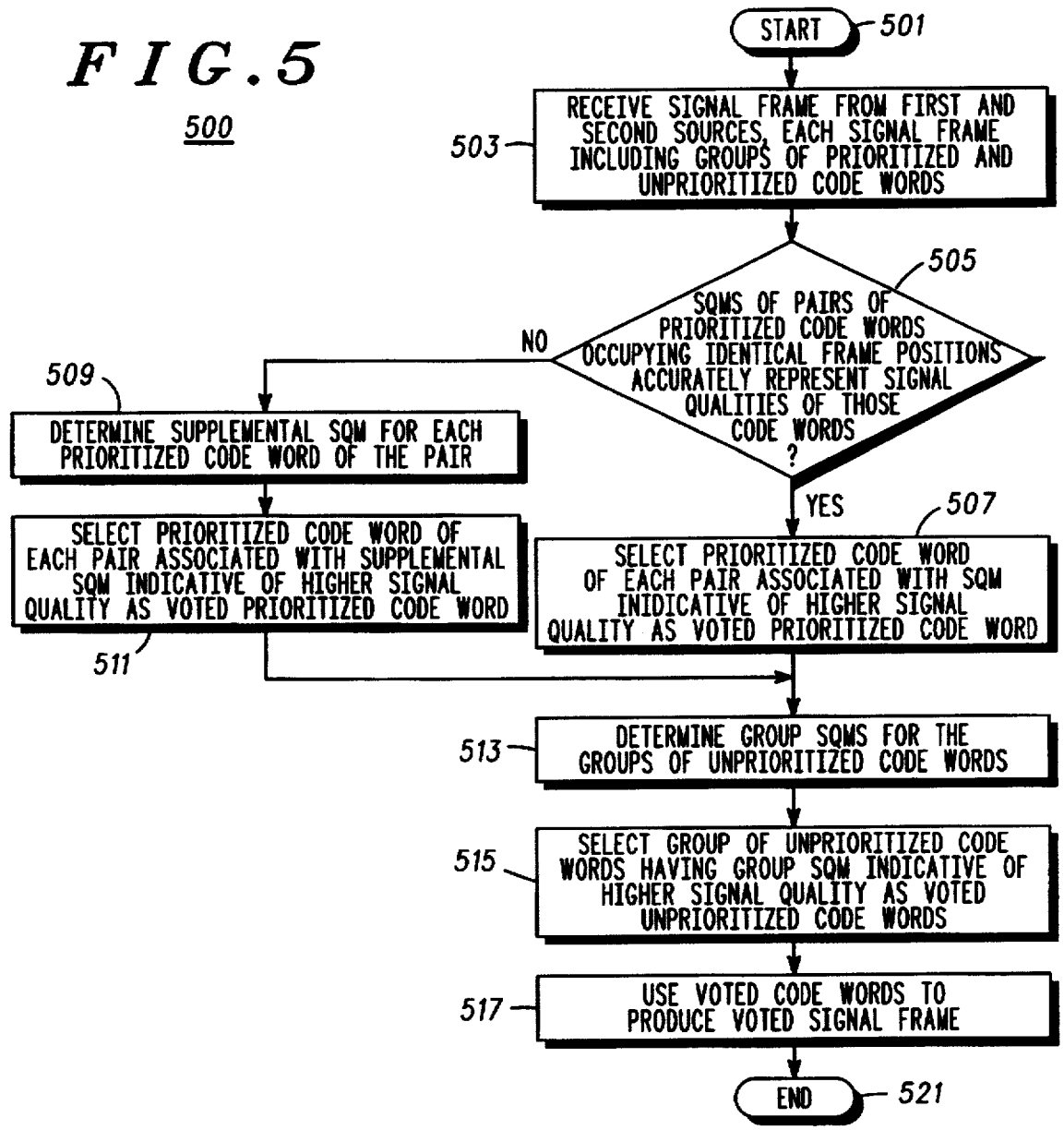
FIG. 5 illustrates a logic flow diagram of steps executed by a comparator to perform diversity voting in accordance with an alternative embodiment of the present invention.

FIG. 5 illustrates a logic flow diagram 500 of steps executed by a comparator to perform diversity voting in accordance with an alternative embodiment of the present invention. The logic flow begins (501) when the comparator receives (503) a signal frame from a first signal source and a second signal source. Each signal frame includes a group of prioritized code words and a group of unprioritized code words. Each code word of the group of prioritized code words has a code word signal quality metric (SQM) associated therewith; whereas, each code word of the group of unprioritized code words does not. In addition, each signal frame preferably has a signal frame signal quality metric associated therewith.

Upon receiving the signal frames, the comparator determines (505) whether the signal quality metrics of pairs of prioritized code words occupying identical frame positions in their respective signal frames accurately represent signal qualities of those code words. For example, when the group of prioritized code words in each signal frame is the code words in the first and third frame positions of the signal frames, the comparator determines whether the code word signal quality metrics of the first-positioned code words of the two signal frames accurately represent the signal qualities of those first-positioned code words. Similarly, the comparator determines whether the code word signal quality metrics of the third-positioned code words of the two signal frames accurately represent the signal qualities of those third-positioned code words. As discussed above, these determinations may comprise comparing the code word signal quality metrics to a threshold or to each other.

When the signal quality metrics of any pair of prioritized code words accurately represent the signal qualities of those code words, the comparator selects (507) the prioritized code word of the pair that is associated with a signal quality metric indicative of a higher signal quality than the other prioritized code word of the pair as the voted prioritized code word for input into the corresponding frame position in the voted signal frame. However, when the signal quality metrics of any pair of prioritized code words do not accurately represent the signal qualities of those code words, the comparator determines (509) a supplemental signal quality metric for each prioritized code word of the pair. The supplemental signal quality metric for a prioritized code word in a signal frame is preferably the signal frame signal quality metric of that signal frame. In an alternative embodiment, the supplemental signal quality metric for a prioritized code word might be a weighted, or scaled, version of the code word signal quality metric, wherein the weighting is based on the signal quality metric of the signal frame containing the prioritized code word. Upon determining the supplemental signal quality metrics for the prioritized code words, the comparator selects (511) the prioritized code word of each pair that is associated with the supplemental signal quality metric which is indicative of a higher signal quality as the voted prioritized code word of the particular pair for input into the corresponding frame position of the voted signal frame.

In addition to selecting the voted prioritized code words, the comparator determines (513) group signal quality metrics for the two groups of unprioritized code words. The unprioritized code words are those code words of a signal frame that do not have an individual code word signal quality metric associated therewith. In the above example, when each signal frame includes five code words, the code words in the second, fourth, and fifth frame positions are considered unprioritized code words because only the code words in the first and third frame positions have code word signal quality metrics associated therewith. Each group signal quality metric is derived from the signal frame signal quality metric of the signal frame that contains the particular group of unprioritized code words and the code word signal quality metrics of the prioritized code words in the signal frame. In a preferred embodiment, wherein all signal quality metrics comprise error statuses, the group signal quality metric for the group of unprioritized code words in the first signal frame is the signal frame signal quality metric of the first signal frame less the code word signal quality metrics of the prioritized code words in the first signal frame. Similarly, the group signal quality metric for the group of unprioritized code words in the second signal frame is the signal frame signal quality metric of the second signal frame less the code word signal quality metrics of the prioritized code words in the second signal frame.

Having determined the group signal quality metrics for the groups of unprioritized code words, the comparator selects (515) the group of unprioritized code words having a group signal quality metric indicative of a higher signal quality as the voted unprioritized code words for input into the respective frame positions of the voted signal frame. Thus, using the example above, the selected unprioritized group of code words in the second, fourth, and fifth frame positions of a signal frame constitute the code words to be input into the second, fourth, and fifth frame positions of the voted signal frame. Upon selecting all the voted code words, the comparator uses (517) the voted code words to produce the voted signal frame and the logic flow ends (521). The comparator inserts the voted code words into their appropriate frame positions to produce the voted signal frame.

The present invention encompasses a method and apparatus for performing diversity voting in a communication system. With this invention, signal quality metric accuracy is taken into account when performing diversity voting of signal frame code words. This is especially important when a signal quality metric is not provided to the comparator for every code word in the signal frames—e.g., due to lack of wireline throughput capacity—and when errors in one code word of a signal frame propagate into other code words of the signal frame (as in IMBE encoded signals generated pursuant to the APCO 25 standard). By analyzing signal quality metric accuracy before using priority code word signal quality metrics to select corresponding voted code words, the present invention substantially reduces the probability that questionable signal quality metric values will influence the voting decisions, thereby increasing the probability that higher quality code words are used to produce the voted signal frame.

While the present invention has been particularly shown and described with reference to particular embodiments thereof, it will be understood by those skilled in the art that various changes in form and details may be made therein without departing from the spirit and scope of the present invention.

We claim:

1. A method comprising the steps of:
  a) receiving a signal frame from each of a plurality of signal sources to produce a plurality of signal frames, each signal frame of the plurality of signal frames including a group of code words, each group of code words including a prioritized code word to produce a plurality of prioritized code words, each prioritized code word of the plurality of prioritized code words occupying a particular frame position in a respective signal frame and having a corresponding signal quality metric associated therewith to produce a plurality of signal quality metrics;
  b) determining whether the plurality of signal quality metrics accurately represent respective signal qualities of the plurality of prioritized code words;

c) when the plurality of signal quality metrics do not accurately represent the respective signal qualities of the plurality of prioritized code words,
   1) determining a supplemental signal quality metric for each prioritized code word of the plurality of prioritized code words to produce a plurality of supplemental signal quality metrics; and
   2) selecting a prioritized code word of the plurality of prioritized code words based on a comparison of the plurality of supplemental signal quality metrics to produce a voted code word.

2. The method of claim 1, further comprising the steps of:
d) when the plurality of signal quality metrics accurately represent the respective signal qualities of the plurality of prioritized code words, selecting a prioritized code word of the plurality of prioritized code words based on a comparison of the plurality of signal quality metrics to produce the voted code word.

3. The method of claim 2, wherein step (d) comprises the step of:
   d1) when the plurality of signal quality metrics accurately represent the respective signal qualities of the plurality of prioritized code words, selecting a prioritized code word of the plurality of prioritized code words having a signal quality metric associated therewith that is indicative of a higher signal quality than a signal quality metric associated with any other prioritized code word of the plurality of prioritized code words.

4. The method of claim 3, wherein step (d1) comprises the step of:
   d1a) when the plurality of signal quality metrics accurately represent the respective signal qualities of the plurality of prioritized code words, selecting a prioritized code word of the plurality of prioritized code words having a signal quality metric associated therewith that is less than a signal quality metric associated with any other prioritized code word of the plurality of prioritized code words.

5. The method of claim 1, wherein step (c2) comprises the step of selecting a prioritized code word of the plurality of prioritized code words having a supplemental signal quality metric associated therewith that is indicative of a higher signal quality than a supplemental signal quality metric associated with any other prioritized code word of the plurality of prioritized code words.

6. The method of claim 5, wherein step (c2) comprises the step of selecting a prioritized code word of the plurality of prioritized code words having a supplemental signal quality metric associated therewith that is less than a supplemental signal quality metric associated with any other prioritized code word of the plurality of prioritized code words.

7. The method of claim 1, further comprising the step of using the voted code word to produce a voted signal frame of voted code words, wherein the voted code word occupies the particular frame position in the voted signal frame.

8. The method of claim 1, wherein step (b) comprises the steps of:
   b1) determining that the plurality of signal quality metrics do not accurately represent the respective signal qualifies of the plurality of prioritized code words when the plurality of signal quality metrics indicate that the plurality of prioritized code words are of equal or lower signal quality than a predetermined quality threshold.

9. The method of claim 8, wherein step (b1) comprises the step of:
   b1a) determining that the plurality of signal quality metrics do not accurately represent the respective signal qualifies of the plurality of prioritized code words when the plurality of signal quality metrics are greater than or equal to the predetermined quality threshold.

10. The method of claim 1, wherein step (b) comprises the step of:
   b1) determining that the plurality of signal quality metrics do not accurately represent the respective signal qualities of the plurality of prioritized code words when the plurality of signal quality metrics are substantially equal.

11. The method of claim 1, wherein each signal frame has a signal frame signal quality metric associated therewith and wherein step (c1) comprises the step of determining the supplemental signal quality metric for each prioritized code word of the plurality of prioritized code words as a signal frame signal quality metric of a signal frame that includes the prioritized code word.

12. The method of claim 1, wherein each signal frame has a signal frame signal quality metric associated therewith, wherein each group of code words further includes an unprioritized code word to produce a plurality of unprioritized code words, and wherein each unprioritized code word of the plurality of unprioritized code words occupies a second particular frame position in a respective signal frame, the method further comprising the steps of:
   d) determining a signal quality metric for each unprioritized code word of the plurality of unprioritized code words based on a signal frame signal quality metric of the respective signal frame that includes the unprioritized code word and a signal quality metric of a prioritized code word of the plurality of prioritized code words that occupies a frame position in the respective signal frame that includes the unprioritized code word; and
   e) selecting an unprioritized code word of the plurality of unprioritized code words having a signal quality metric that is indicative of a higher signal quality than a signal quality metric of any other unprioritized code word of the plurality of unprioritized code words.

13. A method comprising the steps of:
   a) receiving a first signal frame from a first signal source and a second signal frame from a second signal source, each signal frame including a plurality of code words, a prioritized code word of the first signal frame occupying a particular frame position in the first signal frame and having a first signal quality metric associated therewith and a prioritized code word of the second signal frame occupying the particular frame position in the second signal frame and having a second signal quality metric associated therewith;
   b) determining whether the first signal quality metric accurately represents a signal quality of the prioritized code word of the first signal frame and whether the second signal quality metric accurately represents a signal quality of the prioritized code word of the second signal frame;
   c) when the first signal quality metric does not accurately represent the signal quality of the prioritized code word of the first signal frame and the second signal quality metric does not accurately represent the signal quality of the prioritized code word of the second signal frame,
      1) determining a supplemental signal quality metric for the prioritized code word of the first signal frame;
      2) determining a supplemental signal quality metric for the prioritized code word of the second signal frame;
      3) selecting the prioritized code word of the first signal frame to produce a voted code word when the supplemental signal quality metric for the prioritized code word of the first signal frame is indicative of a higher signal quality than the supplemental signal quality metric for the prioritized code word of the second signal frame; and d) when the first signal quality metric accurately represents the signal quality of the prioritized code word of the first signal frame, selecting the prioritized code word of the first signal frame to produce the voted code word when the first signal quality metric is indicative of a higher signal quality than the second signal quality metric.

14. The method of claim 13, wherein step (d) comprises the step of:

d1) when the first signal quality metric accurately represents the signal quality of the prioritized code word of the first signal frame, selecting the prioritized code word of the first signal frame to produce the voted code word when the first signal quality metric is less than the second signal quality metric.

15. The method of claim 13, wherein step (b) comprises the step of:

b1) determining that the first signal quality metric does not accurately represent the signal quality of the prioritized code word of the first signal frame and that the second signal quality metric does not accurately represent the signal quality of the prioritized code word of the second signal frame when the first signal quality metric is of equal or lower signal quality than a predetermined quality threshold and the second signal quality metric is of equal or lower signal quality than the predetermined quality threshold.

16. The method of claim 13, wherein step (b) comprises the step of:

b1) determining that the first signal quality metric does not accurately represent the signal quality of the prioritized code word of the first signal frame and that the second signal quality metric does not accurately represent the signal quality of the prioritized code word of the second signal frame when the first signal quality metric is substantially equal to the second signal quality metric.

17. The method of claim 13, wherein each signal frame has a signal quality metric associated therewith and wherein step (c1) comprises the step of determining the supplemental signal quality metric for the prioritized code word of the first signal frame as being a signal quality metric of the first signal frame and wherein step (c2) comprises the step of determining the supplemental signal quality metric for the prioritized code word of the second signal frame as being a signal quality metric of the second signal frame.

18. The method of claim 13, wherein each signal frame has a signal quality metric associated therewith and wherein at least one unprioritized code word of each signal frame occupies at least one respective frame position in each signal frame, the method further comprising the steps of:

e) determining a signal quality metric for the at least one unprioritized code word of the first signal frame based on the first signal quality metric and a signal quality metric of the first signal frame;

f) determining a signal quality metric for the at least one unprioritized code word of the second signal frame based on the second signal quality metric and a signal quality metric of the second signal frame; and g) selecting the at least one unprioritized code word of the first signal frame to produce at least a second voted code word when the signal quality metric of the at least one unprioritized code word of the first signal frame indicates that the at least one unprioritized code word of the first signal frame is of a higher signal quality than the at least one unprioritized code word of the second signal frame, the at least a second voted code word occupying the at least one respective frame position in a signal frame of voted code words.

19. In a comparator of a digital radio communication system that utilizes diversity techniques to produce a plurality of voted signal frames, each of the plurality of voted signal frames including a plurality of voted code words, a method for selecting the plurality of voted code words to be inputted into a voted signal frame of the plurality of voted signal frames, the method comprising the steps of:

a) receiving a signal frame from each of a plurality of signal sources to produce a plurality of signal frames, each signal frame of the plurality of signal frames including a group of prioritized code words and a group of unprioritized code words that together constitute improved multi-band excitation (IMBE) encoding of an audio signal, each group of prioritized code words including a first prioritized code word and a second prioritized code word to produce a plurality of first prioritized code words and a plurality of second prioritized code words, each first prioritized code word of the plurality of first prioritized code words occupying a first frame position in a respective signal frame and having a corresponding signal quality metric associated therewith to produce a plurality of first signal quality metrics, each second prioritized code word of the plurality of second prioritized code words occupying a second frame position in a respective signal frame and having a corresponding signal quality metric associated therewith to produce a plurality of second signal quality metrics;

b) determining whether the plurality of first signal quality metrics indicate that the plurality of first prioritized code words are of a higher signal quality than a predetermined quality threshold;

c) when the plurality of first signal quality metrics indicate that the plurality of first prioritized code words are not of a higher signal quality than the predetermined quality threshold, 1) determining a supplemental signal quality metric for each first prioritized code word of the plurality of first prioritized code words to produce a first plurality of supplemental signal quality metrics;

2) selecting a first prioritized code word of the plurality of first prioritized code words having a supplemental signal quality metric associated therewith that is indicative of a higher signal quality than a supplemental signal quality metric associated with any other first prioritized code word of the plurality of first prioritized code words to produce a first voted code word, the first voted code word occupying a first frame position of the voted signal frame;

d) determining whether the plurality of second signal quality metrics are substantially equal;

e) when the plurality of second signal quality metrics are substantially equal, 1) determining a supplemental signal quality metric for each second prioritized code word of the plurality of second prioritized code words to produce a second plurality of supplemental signal quality metrics;

2) selecting a second prioritized code word of the plurality of second prioritized code words having a supplemental signal quality metric associated therewith that is indicative of a higher signal quality than a supplemental signal quality metric associated with any other second prioritized code word of the plurality of second prioritized code words to produce a second voted code word, the second voted code word occupying a second frame position of the voted signal frame;

f) determining a signal quality metric for each group of unprioritized code words; and g) selecting a group of unprioritized code words having a signal quality metric associated therewith that is indicative of a higher signal quality than a signal quality metric associated with any other group of unprioritized code words to produce a group of voted unprioritized code words, each unprioritized code word of the group of voted unprioritized code words occupying a respective frame position of the voted signal frame.

20. A diversity radio communication system, comprising:

a plurality of base stations, each of the plurality of base stations receiving a digital communication signal from a communication unit and parsing the digital communication signal into a plurality of signal frames, wherein each of the plurality of signal frames includes a plurality of code words, each of the plurality of base stations further determining a signal quality metric for a prioritized code word of the plurality of code words in each signal frame, the prioritized code word of each signal frame occupying a particular frame position in each signal frame; and a comparator, coupled to the plurality of base stations, that receives a first signal frame of the plurality of signal frames from each base station of the plurality of base stations, that determines whether the signal quality metric of each prioritized code word accurately represents a signal quality of each prioritized code word, and that (i) determines a supplemental signal quality metric for each prioritized code word to produce a plurality of supplemental signal quality metrics and (ii) selects a prioritized code word to produce a voted code word based on a comparison of the plurality of supplemental signal quality metrics when the signal quality metric of each prioritized code word does not accurately represent the signal quality of each prioritized code word, the voted code word occupying the particular frame position in a voted signal frame.

* * * * *